C. MARTI.
Animal-Trap.
No. 222,520. Patented Dec. 9, 1879.
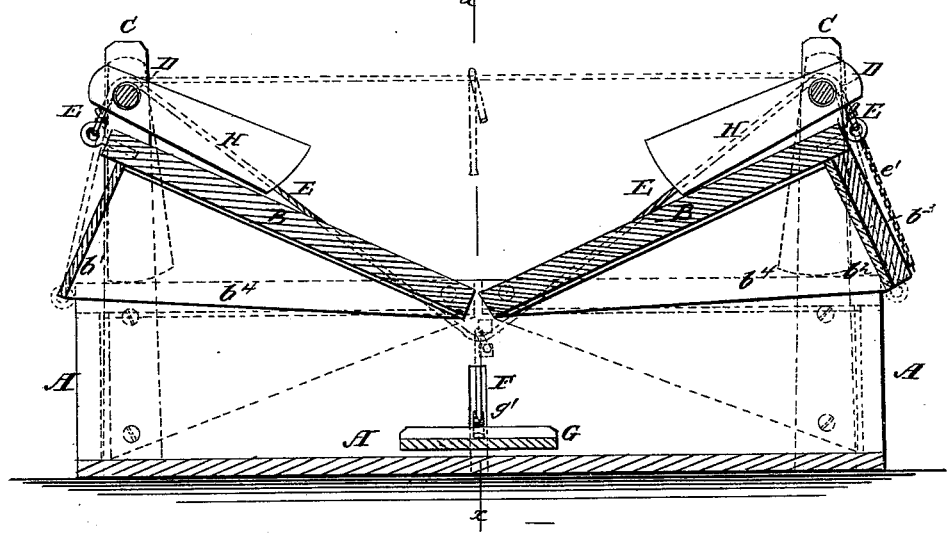
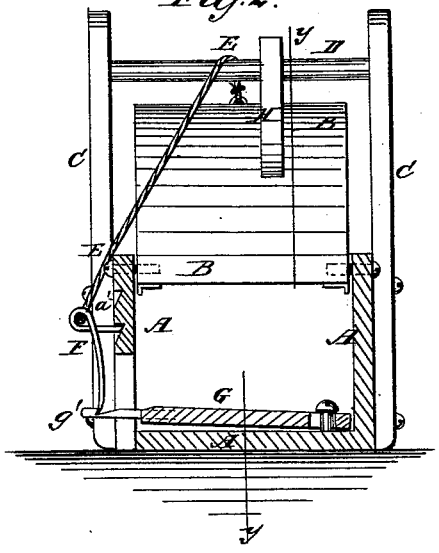
WITNESSES:
Francis McArdle
C. Sedgwick
INVENTOR:
C. Marti
BY Munn & Co
ATTORNEYS.

UNITED STATES PATENT OFFICE.

CASPER MARTI, OF NEW ALBIN, IOWA.

IMPROVEMENT IN ANIMAL-TRAPS.

Specification forming part of Letters Patent No. 222,520, dated December 9, 1879; application filed May 31, 1879.

*To all whom it may concern:*

Be it known that I, CASPER MARTI, of New Albin, in the county of Allamakee and State of Iowa, have invented a new and useful Improvement in Animal-Traps, of which the following is a specification.

Figure 1 is a longitudinal section of my improved trap, taken through the line $y\ y$, Fig. 2, and showing in full lines the position of the parts when the trap is set, and in dotted lines their position when the trap is sprung. Fig. 2 is a vertical cross-section of the same, taken through the line $x\ x$, Fig. 1.

Similar letters of reference indicate corresponding parts.

The object of this invention is to furnish an improved trap for catching rats and other animals, which shall be simple in construction and convenient and effective in use, catching the animal without leaving any trace or scent to frighten others that may come after him.

The invention consists in an improved animal-trap formed of the box, made open at its top and ends, the hinged covers provided, respectively, at their outer ends with the glass plate, and the mirror and facing-plate, and strengthened by the triangular plates, the posts and rounds, the cord, the catch-lever, the hinged plate provided with the notched arm and the swinging lock-bars, as hereinafter fully described.

A is a box, which is made with open top and ends, and of any desired length, width, and height, according to the size of the animals trapped for.

B are the covers of the trap, which are pivoted at their inner ends to and between the upper middle parts of the sides of the box A.

To the outer end of one of the covers B is attached a glass plate, $b'$, of such a shape and size as to fit into and tightly close the end of the box A. To the outer end of the other cover B is attached a mirror, $b^2$, faced upon its outer side with a board or plate, $b^3$.

The mirror $b^2$ and the plate $b^3$ are made of such a shape and size as to close the end of the box A.

The plates $b'$ and $b^2$ $b^3$ are strengthened, and the escape of the animal further guarded against, by the triangular plates $b^4$, attached to the side edges of the said plates, and of the covers B.

To the end parts of the sides of the box A are attached posts C. The upper ends of the pair of posts C, at each end of the box A, are connected by a round, D, over which passes a cord, E. The ends of the cord E are attached to the outer ends of the two covers B.

Upon the middle part of the cord E is placed a bent catch-lever, F, one end of which, in setting the trap, is placed in a notch, $a'$, formed in the middle part of the side A. The other end of the catch-lever F is placed in a notch in the arm $g'$, formed upon or attached to the end of the plate G, and which passes out through a vertical slot in the side A, so as to hold the end of the said plate G a little raised.

The plate G has a short slot formed in it near its other end, to receive the bolt or screw by which it is secured and hinged to the bottom of the box A.

With this construction, when the animal, in passing through the box A, steps upon the plate G, the downward movement of the said plate G releases the catch-lever F, and allows the covers B to drop, inclosing the animal in the box A.

To one end of the cord E is attached an extension-piece, $e'$, to lengthen the said cord, and allow the trap to be set with only one cover, B, raised.

To the rounds D are pivoted the upper ends of the swinging lock-bars H, which, when the trap is set, lie along and rest upon the covers B, and which, when the trap is sprung, swing down, so that their lower ends rest upon the upper sides of the said covers B, and lock them closed, as shown in dotted lines in Fig. 1.

I am aware that it is not new to hold the levers of a door by a bar hinged to one side of the top, and provided with a hinged catch at its other end, engaging a lip on the side of trap, or to use a trigger connecting with a tilting platform in the trap, so that when the platform is tilted the catch may be released and the doors allowed to fall.

What I claim as new and of my invention is—

An improved animal-trap, formed of the box A, made open at its top and ends, the hinged covers B B, provided, respectively, at their outer ends with the glass plate $b'$, and the mirror and facing-plate $b^2$ $b^3$, and strengthened by the triangular plates $b^4$, the posts and rounds C D, the cord E, the catch-lever F, the hinged plate G, provided with the arm $g'$, and the swinging lock-bars H, substantially as herein shown and described.

CASPER MARTI.

Witnesses:
J. M. TARTT,
JAMES MURPHY.